United States Patent
Fandli et al.

(10) Patent No.: US 11,647,050 B2
(45) Date of Patent: May 9, 2023

(54) CONSTRAINT RULES FOR CONSTRAINING CREATION OF A SEGMENTATION POLICY

(71) Applicant: Illumio, Inc., Sunnyvale, CA (US)

(72) Inventors: Juraj George Fandli, Campbell, CA (US); Russell Stuart Goodwin, High Wycombe (GB); Ronald Isaacson, Poughkeepsie, NY (US); Roy Nobuo Nakashima, Santa Cruz, CA (US)

(73) Assignee: Illumio, Inc., Sunnyvale, CA (US)

( * ) Notice: Subject to any disclaimer, the term of this patent is extended or adjusted under 35 U.S.C. 154(b) by 148 days.

(21) Appl. No.: 16/953,249

(22) Filed: Nov. 19, 2020

(65) Prior Publication Data

US 2022/0159038 A1     May 19, 2022

(51) Int. Cl.
*H04L 9/40*     (2022.01)
*G06F 9/50*     (2006.01)

(52) U.S. Cl.
CPC ............ *H04L 63/20* (2013.01); *G06F 9/5027* (2013.01)

(58) Field of Classification Search
CPC .... H04L 63/20; H04L 63/0263; G06F 9/5027
USPC .......................................................... 726/1
See application file for complete search history.

(56) References Cited

U.S. PATENT DOCUMENTS

| | | | | |
|---|---|---|---|---|
| 10,785,115 | B2 * | 9/2020 | Mishra | H04L 47/805 |
| 11,121,875 | B2 * | 9/2021 | Kirner | H04L 9/3226 |
| 11,356,483 | B2 * | 6/2022 | Mishra | H04L 43/062 |
| 2012/0116749 | A1 * | 5/2012 | Choi | G06F 40/232 |
| | | | | 704/2 |
| 2020/0220845 | A1 * | 7/2020 | Cook | G06F 9/5061 |

FOREIGN PATENT DOCUMENTS

CN            104021216 A  *  9/2014  ............ G06F 16/80

* cited by examiner

*Primary Examiner* — Kambiz Zand
*Assistant Examiner* — Aubrey H Wyszynski
(74) *Attorney, Agent, or Firm* — Fenwick & West LLP (57) ABSTRACT

A policy management server manages a segmentation policy and policy constraints. The segmentation policy comprises a set of segmentation rules that each permit connections between specified groups of workloads that provide or consume network-based services. The policy constraints comprise a set of constraint rules that determine compliance of the segmentation rules. A workflow process may be initiated to resolve non-compliant rules by enabling an administrator to approve or deny the rule. In a large enterprise managing significant numbers of workloads, the policy constraints may be employed to ensure that overly permissive segmentation rules are not being created. This facilitates creation of a robust and narrowly tailored segmentation policy that reduces exposure of the enterprise to network-based security threats.

20 Claims, 5 Drawing Sheets

CONSTRAINT RULES FOR CONSTRAINING CREATION OF A SEGMENTATION POLICY

BACKGROUND

Technical Field

This application relates generally to network security, and more specifically, to managing creation of a segmentation policy.

Description of Related Art

A segmentation policy comprises a set of rules that control which workloads may communicate on a network and may place restrictions on how such workloads may communicate. To enforce the segmentation policy, distributed firewalls executing on hosts or network midpoint devices receive management instructions for enforcing respective rules of the segmentation policy. The firewalls can filter traffic based on the respective IP addresses and ports of the source and destination, network protocols, and/or or other data to enforce the rules. A segmentation policy may be written using a whitelist model in which the rules define what traffic is allowed and the distributed firewalls block everything else by default. Ideally, a segmentation policy is narrowly tailored to permit only the traffic necessary for normal operation of network services. However, an overly permissive segmentation policy may expose an enterprise to security risks. As the complexity of the network and the number of workloads increases, configuration of the segmentation policy to achieve the desired security effects becomes an increasingly challenging task.

SUMMARY

A policy management server obtains a segmentation policy comprising a set of segmentation rules that specify a white list of permissible connections between workloads providing and consuming network-based services. The policy management server also obtains policy constraints comprising a set of constraint rules that control compliance of the segmentation rules. The policy management server applies the constraint rules to the set of segmentation rules to identify a non-compliant segmentation rule that is within a scope of a matching constraint rule. The policy management server initiates a workflow process to resolve the non-compliant segmentation rule. The policy management server distributes the segmentation policy to the distributed enforcement modules to enable the distributed enforcement modules to enforce the segmentation policy.

In one aspect, the workflow process involves determining that the matching constraint rule has a pre-approval workflow requirement and that the matching constraint rule existed prior to creation of the non-compliant segmentation rule. The policy management server associates an unapproved state with the non-compliant segmentation rule, and sends a notification to an administrative client indicating non-compliance of the non-compliant segmentation rule. In this case, the segmentation policy distributed to the enforcement modules omits the non-compliant segmentation rule while in the unapproved state. The policy management server may subsequently receive an approval for the non-compliant segmentation rule, associate an approved state with the non-compliant segmentation rule, and responsive to an action requesting enforcement of the non-compliant segmentation rule, distributing the non-compliant segmentation rule to the enforcement modules for enforcement.

In another aspect, the workflow process involves determining that the matching constraint rule has a pre-approval workflow requirement and that the non-compliant segmentation rule existed prior to creation of the matching constraint rule. The policy management server associates a pending state with the non-compliant segmentation rule, and sends a notification to an administrative client indicating non-compliance of the non-compliant segmentation rule. In this case, the segmentation policy distributed to the enforcement modules includes the non-compliant segmentation rule in the pending state. The policy management server may subsequently receive an approval for the non-compliant segmentation rule and associate it with an approved state. If the pending rule is denied, the policy management server may request removal or modification of the denied segmentation rule.

In another aspect, the workflow process involves determining that the matching constraint rule has a post-approval workflow requirement. The policy management server associates a pending state with the non-compliant segmentation rule, and sends a notification to an administrative client indicating non-compliance of the non-compliant segmentation rule. In this case, the segmentation policy distributed to the enforcement modules includes the non-compliant segmentation rule in the pending state. The policy management server may subsequently receive an approval and associate an approved state with the segmentation rule.

In another aspect, the workflow process includes automatically generates one or more modified segmentation rules having a more limited scope than the non-compliant segmentation rule and that does not violate the policy constraints. The policy management may then send the one or more modified segmentation rules segmentation rule to the enforcement modules for enforcement.

In an embodiment, the constraint rules each specify a specified service, a specified set of provider workloads, and a specified set of consumer workloads, wherein applying the constraint rules comprises identifying the non-complaint segmentation rule as permitting at least one of the provider workloads to provide the service to at least one of the consumer workloads. The constraint rules may identify the specified consumer workloads and the specified provider workloads by respective multi-dimensional label sets. Furthermore, the constraint rules identify the specified service by at least one of a port, a protocol, and a service identifier.

DETAILED DESCRIPTION

The Figures (FIGS.) and the following description describe certain embodiments by way of illustration only.

One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

A policy management server manages a segmentation policy and policy constraints. The segmentation policy comprises a set of segmentation rules that each permit connections between specified groups of workloads that provide or consume network-based services. The policy constraints comprise a set of constraint rules that determine compliance of the segmentation rules. A workflow process may be initiated to resolve non-compliant rules by enabling an administrator to approve or deny the rule. In a large enterprise managing significant numbers of workloads, the policy constraints may be employed to ensure that overly permissive segmentation rules are not being created. This facilitates creation of a robust and narrowly tailored segmentation policy that reduces exposure of the enterprise to network-based security threats.

Figure 1:
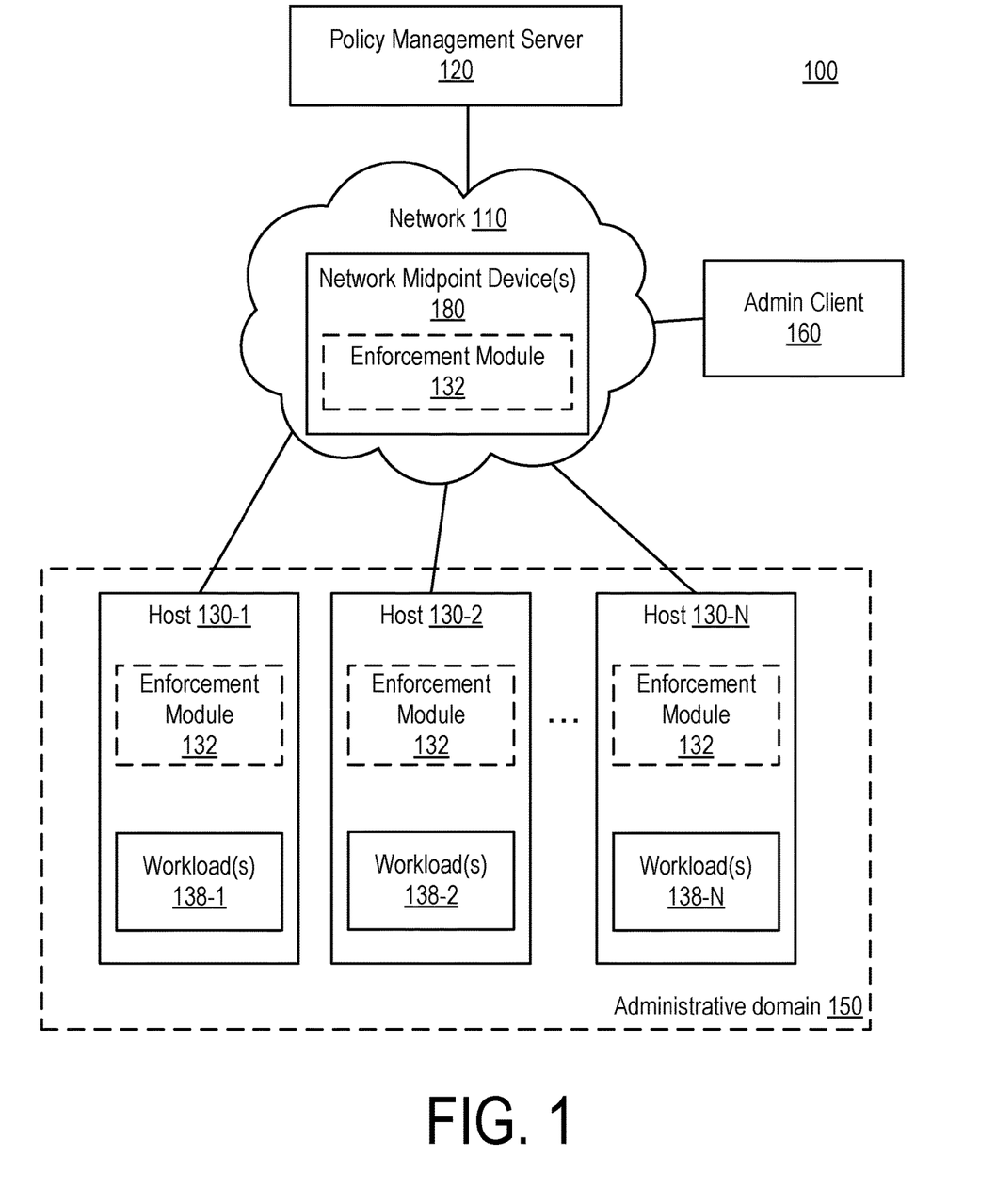
FIG. 1 is a high-level block diagram illustrating an environment for managing a segmentation policy, according to one embodiment.

FIG. 1 is a high-level block diagram illustrating a networked computing environment 100. The networked computing environment 100 includes a policy management server 120, a network 110 including one or more network midpoint devices 180, an administrative client 160, and an administrative domain 150 that includes a plurality of hosts 130 (e.g., hosts 130-1, 130-2, . . . , 130-N). The administrative domain 150 can correspond to a set of devices controlled by an enterprise such as, for example, a service provider, a corporation, a university, or a government agency.

The hosts 130 may each comprise a physical host device, a virtual machine executing on computer system, or an operating system instance executing on a physical host device or virtual machine capable of hosting one or more workloads 138. A single physical or virtual machine may operate a single host 130 or may operate multiple hosts 130. The hosts 130 each execute one or more workloads 138 (e.g., one or more workloads 138-1, one or more workloads 138-2, etc.). The workloads 138 comprise independently addressable computing units for performing computing tasks. For example, each workload 138 may be addressable on the network 110 by a specific network address associated with the host 130 and a port associated with a service provided by the workload 138. A workload 138 may comprise, for example, an application or application component, a process, or other sub-component thereof executing on the host 130. In some instances, a host 130 may operate only a single workload 138. In other instances, a host 130 may operate multiple workloads 138 (e.g., using multiple containers in a containerized environment) that may be independently addressable and may execute different applications or otherwise perform different independent computing functions. In some embodiments, multiple workloads 138 may operate collectively to execute an application. The workloads 138 on the hosts 130 may communicate with other workloads 138 on different hosts 130 within the administrative domain 150 to perform various tasks.

The network 110 represents the communication pathways between the policy management server 120, the administrative client 160, and the hosts 130. In one embodiment, the network 110 uses standard communications technologies and/or protocols and can include the Internet. In another embodiment, the entities on the network 110 can use custom and/or dedicated data communications technologies. The network 110 includes one or more network midpoint devices 180 that facilitate communications over the network 110. The network midpoint devices 180 may include, for example, routers, switches, access points, firewall devices, or other devices that control communications between the workloads 138 over the network 110.

The policy management server 120 is a computer (or set of computers) that obtains and stores information about the hosts 130 on the network 110, the network midpoint devices 180, and the workloads 138 executing on the hosts 130. The policy management server 120 manages a segmentation policy for the administrative domain 150 that when enforced, regulates communications between workloads 138 within the administrative domain 150. In an embodiment, the segmentation policy is set forth using permissive rules (i.e., a white list) that specify connections that are permitted. The segmentation policy is enforced by blocking connections that are not expressly permitted by the rules. For example, the segmentation policy includes a set of rules specifying whether certain workloads 138 are allowed to provide services to or receive services from other workloads 138, and may place restrictions on how those workloads 138 are allowed to communicate when providing or consuming the services. For example, a segmentation policy may include a rule specifying that a workload 138-1 operating on a host 130-1 is allowed to provide a particular service to a workload 138-2 operating on a host 130-2. Absent other rules, the workload 138-1 will thus be blocked from providing the service to a workload 138-N operating on a host 130-N. The rule may furthermore specify the type of service that the workload 138-1 is allowed to provide to workload 138-2 (e.g., a database service, a web service, etc.) and/or a specific port number that is allowed. Additionally, the rule may specify how the workloads 138-1, 138-2 may communicate over a connection (e.g., using encrypted communication only, using authenticated communication only, etc.). A rule may be specified as a plurality of fields including a "service," a "provider" portion that identifies one or more workloads 138 that is permitted to provide the service (which may be specified by a port number), a "consumer" portion that identifies one or more workloads 138 that is permitted to consume the service provided by the workloads 138 in the "provider." The rule may furthermore specify a "rule function" that may place one or more restrictions on the communications between the workloads 138 while facilitating the service. Generally, a given rule permits outbound connection requests from the consumer workloads to the provider workloads and permits inbound connection requests to the provider workloads from the consumer workloads.

In an embodiment, the policy management server 120 may assign one or more labels to each workload 138 that define one or more high-level characteristics of the workload 138. Labels may be multi-dimensional. Here, a label may comprise a "dimension" (a high-level characteristic) and a "value" (the value of that high-level characteristic). For example, one possible label dimension may specify a "role" of the workload 138 and may have values such as "web," "API," or "database" specifying the role of the workload 138 within the administrative domain 150. In another example, a label dimension may specify a "location" of the workload 138 and may have values such as "United States" or "Europe." Workloads 138 may also be labeled based on a user group of a user that is logged into the workload 138 or the corresponding host 130 on which the workload 138 executes. For example, a workload 138 may have a label with a dimension "user group" and a value "managers." Each workload 138 may be assigned labels for one or more dimensions but each workload 138 does not necessarily have a label assigned for every possible dimension. For example, a workload 138 may have a label specifying its location but may not necessarily have a label specifying its role. If a value for a label dimension is not expressly provided in the rule, the rule is interpreted as including all values for that dimension. The set of labels assigned to a particular workload 138 may be referred to herein as a label set for the workload 138.

A logical management model specifying the number and types of dimensions available and those dimensions' possible values may be configurable. In one embodiment, the logical management model includes the following dimensions and possible values, as shown in Table 1:

TABLE 1

Example of logical management model

| Dimension | Meaning (M), Values (V) |
|---|---|
| Role | M: The role of the workload within the administrative domain.<br>V: web, API, database |
| Environment | M: The lifecycle stage of the workload.<br>V: production, staging, development |
| Application | M: The logical application (higher-level grouping of managed servers) to which the workload belongs.<br>V: trading, human resources |
| Line of Business | M: The business unit to which the workload belongs.<br>V: marketing, engineering |
| Location | M: The location of the workload. Can be physical (e.g., country or geographical region) or logical (e.g., network). Physical is particularly useful for expressing geographic compliance requirements.<br>V: US or EU (physical), us-west-1 or us-east-2 (logical) |
| User Group | M: The user group containing the user logged onto the workload.<br>V: Engineers, Contractors, Managers, System Administrators |

The policy management server 120 may utilize label sets to enable the segmentation policy to be defined at a high level of abstraction by specifying rules based on label sets. Thus, a rule of the segmentation policy may identify a group of workloads 138 to which a portion of the rule is applicable by referencing one or more label sets. For example, a rule may specify that a first group of workloads 138 with a label set A may provide a service B to a second group of workloads 138 with a label set C. Rules may be specified for groups of workloads 138 identified using only a subset of the label dimensions.

The policy management server 120 may retain a repository storing information about the hosts 130 and the workloads 138 managed by the policy management server 120. For example, the policy management server 120 may store workload identifiers that identify the workloads 138, and membership information indicating one or more groups of workloads 138 to which each workload 138 belong (e.g., as defined by the respective label sets for the workloads 138).

Table 2 illustrates an example of information stored by the policy management server 120. Here, the workload IDs represent the workload identifiers for the workloads 138. The memberships represent groups to which one or more workloads 138 belongs. Each group may correspond to a unique label set involving one or more dimensions.

TABLE 2

Example of a Repository Table

| Workload ID | Memberships |
|---|---|
| ID1 | A, C, D |
| ID2 | B, C |
|  | D |
| . | . |
| . | . |
| . | . |
| IDn | B, D, E, F |

Instead of enforcing the segmentation policy at a centralized device, the segmentation policy is instead enforced in a distributed manner by at least a subset of the hosts 130 and/or the network midpoint devices 180. To enable enforcement of the segmentation policy, the policy management server 120 generates a set of management instructions and distributes the management instructions to enforcement modules 132 that may be executed on the hosts 130 or on the network midpoint devices 180. The management instructions include the rules that when enforced, control communications between different groups of workloads 138 (e.g., specified by their label sets or directly by an identifier of the workload 138) and membership information indicating workloads 138 belonging to each group (e.g., which workloads 138 have certain label sets). For efficiency of distribution, the policy management server 120 may send different management instructions to different enforcement modules 132 so that each enforcement module 132 gets only the management instructions relevant to its operation. Here, the policy management server 120 may determine which rules are relevant to a given enforcement module 132 and distribute the relevant rules to that enforcement module 132. A rule may be deemed relevant to an enforcement module 132 on a particular host 130 if that host 130 executes one or more workloads 138 that belongs to a group (defined by one or more label sets) referenced by the rule and the enforcement module 132 on the host 130 is configured to enforce that particular rule. A rule may be deemed relevant to an enforcement module 132 on a particular network midpoint device 180 if that network midpoint device 180 is upstream from a host 130 executing one or more workloads 138 that belongs to a group (defined by one or more label sets) referenced by the rule and the enforcement module 132 on the network midpoint device 180 is configured to enforce that particular rule. The policy management server 120 may furthermore determine which membership information is relevant to each enforcement module 132 and distribute the relevant membership information to each respective enforcement module 132. Here, membership information may be relevant to a particular enforcement module 132 if it defines membership of a group referenced by a rule deemed relevant to the particular enforcement module 132.

In an embodiment, the enforcement modules 132 may store logs of traffic flow data indicating traffic that is blocked by a traffic filter and traffic that is allowed to pass through the traffic filter. The enforcement modules 132 may report respective traffic flow data to the policy management server 120. The policy management server 120 may analyze the traffic flow data to generate a traffic flow graph comprising a representation of connections or attempted connections, and an enforcement state of workloads 138 under the segmentation policy as described in further detail below.

The administrative client 160 comprises a computing device that may be operated by an administrator of the administrative domain 150 being managed by the policy management server 120. The administrative client 160 may execute an interface (e.g., via an application or web browser) that enables the administrator to interact with the policy management server 120 to configure or view the segmentation policy. For example, the administrative client 160 may enable the administrator to create new segmentation rules, remove segmentation rules, or modify existing segmentation rules. The interface may furthermore enable the administrator to obtain various information about the hosts 130 and workloads 138 on the network 120 and view traffic flows between the workloads 138 as described above. In some embodiments, the interface may automatically generate recommendations for generating, removing, or modifying segmentation rules based on observed traffic flows.

In a large enterprise with significant number of workloads 138, management of the segmentation policy may be shared by multiple different administrators. Different administrators may have different privileges with respect to managing the segmentation policy. For example, various managers have privileges for creating, removing, or modifying segmentation rules associated with different groups of workloads 138. In an embodiment, a manager may be associated with a particular label set, and the manager is given privileges to control segmentation rules affecting workloads 138 within the scope of that label set. A provisioner has privileges for reviewing, approving, or denying the rules generated by the managers. Provisioners may also be associated with label sets that limit the set of segmentation rules a provisioner controls.

The policy management server 120 may furthermore implement policy constraints that controls how segmentation rules are processed through the creation and provisioning workflows. The policy constraints include one or more constraint rules that each define a set of conditions for identifying non-compliant rules. Rules that meet one of the constraint rules are deemed non-compliant and rules that do not meet any of the constraint rules are deemed compliant. In an embodiment, a label-based constraint rule is defined by a specified a service (defined by a port, protocol, service name, or other parameter), a specified label set for a group of provider workloads that provide the service, and a specified label set for a group of consumer workloads that consume the service. A segmentation rule is non-compliant if the segmentation rule permits a connection within the scope of a constraint rule. In other words, a segmentation rule is non-compliant if it meets each of three conditions: (1) the group of provider workloads specified by the segmentation rule includes at least one workload within the scope of the label set for the provider workloads of the constraint rule; (2) the group of consumer workloads specified by the segmentation rule includes at least one workload within the scope of the label set for the consumer workloads of the constraint rule; and (3) the set of services specified by the segmentation rule includes at least one service within the set of services defined by the constraint rule. If any one of the conditions is not satisfied, then the constraint rule is not met and the segmentation rule is compliant with respect to that constraint rule.

Other types of constraint rules may specify different types of constraints that if met by a segmentation rule, cause the segmentation rule to be deemed non-compliant. Some constraint rules may be effect-based rules that deem a segmentation rule non-compliant if the effect of that segmentation rule meets a specified condition. For example, a constraint rule may be met by any segmentation rule that affects more than N workloads, where N is a parameter specified in the constraint rule. In another example, a constraint rule may be met by any segmentation rule that opens up traffic on more than M ports. In yet another example, a constraint rule may be met if it enables traffic to a predefined set of critical applications without requiring encryption. In yet another example, a constraint rule may be met if it allows any traffic between the Active Directory of an operating system and a non-Windows machines.

Each constraint rule also defines an approval workflow field that controls how segmentation rules that violate the constraint rule are processed. In an embodiment, the approval workflow field can be set to either "pre-approval" or "post-approval." When the approval workflow field is set to post-approval, a segmentation rule that is not compliant with the constraint rule still initially gets enforced, but is stored in a "pending" state. One or more responsible administrators (e.g., a manager and/or a provisioner) are alerted that the rule is not compliant. If the provisioner approves the non-compliant rule, it is changed from a pending state to an approved state. If the provisioner denies the rule, then it remains in the pending state, and a notification may be sent to the manager that created the rule to indicate that the denial. The manager may then remove the rule or provide further justification for approving the rule for consideration by the provisioner.

When the approval workflow field of a constraint rule is set to pre-approval, the constraint rule is applied differently depending on whether the constraint rule was created before or after a non-compliant segmentation rule. If a later-created segmentation rule is not compliant with an existing constraint rule, the segmentation rule is initially stored in an unapproved state. Here, the rule is not immediately made effective and is not distributed to the enforcement modules 132 for enforcement. A provisioner can review the unapproved rule and either allow the rule or deny it. If the rule is allowed, then it is changed to an approved state. The manager is then notified and may take action to make the rule effective. If the rule is denied, the manager is notified and may either remove the rule or resubmit it with further justification to why it should be approved. Alternatively, the approval or disapproval of the rule may automatically cause the rule to become effective or be removed, without necessarily requiring further action from the manager.

Segmentation rules that are created prior to a constraint rule being created are treated according to the post-approval workflow even if the workflow field is set to pre-approval. Thus, a new constraint rule does not effect segmentation rules that are already being enforced. Instead, the provisioner and/or the manager is alerted that the rule is now non-compliant and the provisioner may either allow the segmentation rule or deny it.

An example of a constraint rule may be written as follows:

| Example Constraint Rule 1 | | | |
| --- | --- | --- | --- |
| Providers | Service | Consumers | Approval Workflow |
| All workloads | Telnet (23/TCP) | All Workloads | Pre-approval |

This constraint rule specifies that any segmentation rule that allows Telnet services are non-compliant. Because the constraint rule specifies a pre-approval workflow, any segmentation rules permitting Telnet that are created after the constraint rule is effective will be placed in an unapproved state and will not be made effective unless approved by a provisioner. Segmentations rules permitting Telnet that existed prior to the constraint rule being created will remain effective and sent to a provisioner to approve or deny the rule.

In an example application, the above constraint rule may be applied to the following example segmentation rule:

| Example Segmentation Rule 1 | | |
| --- | --- | --- |
| Providers | Service | Consumers |
| App: A, Role: Front End | Telnet (23/TCP) | App: A |

Here, it can be seen that: (1) the provider workloads having the label set "App: A, Role: Front End" are within the scope of "All workloads" specified by the constraint rule; (2) the consumer workloads having the label set "App: A" are within the scope of "All workloads" specified by the constraint rule; and (3) the service "Telnet (23/TCP)" is within the scope of the same service "Telnet (23/TCP)" specified by the constraint rule. Therefore, the segmentation rule meets the constraint rule and is non-compliant.

In a second example, a constraint rule may be written as follows:

| Example Constraint Rule 2 | | | |
| --- | --- | --- | --- |
| Providers | Service | Consumers | Approval Workflow |
| Env: Production | All Services | Env: Dev | Pre-approval |

This constraint rule specifies that any segmentation rule permitting traffic for any services from the development environment to the production environment is non-compliant.

The above constraint rule may be applied to the following example segmentation rule:

| Example Segmentation Rule 2a | | |
| --- | --- | --- |
| Providers | Service | Consumers |
| Env: Dev | SSH 22/TCP | Env: Dev |

Here, it can be seen that: (1) the provider workloads having the label set "Env: Dev" are not within the scope of "Env: Production" specified by the constraint rule; (2) the consumer workloads having the label set "Env: Dev" are within the scope of "Env: Dev" specified by the constraint rule; and (3) the service "SSH 22/TCP" is within the scope of the "All services" specified by the constraint rule. Because condition (1) is not met, the segmentation rule does not violate the constraint rule.

When applying constraint rules to a segmentation rule, the absence of a specific label dimension in the provider or consumer portions of the segmentation rule or the constraint rule means that the rule is applicable to workloads across all values of the label in the missing dimension. In other words, the condition only requires that specified label dimension match, but places no conditions on the other label dimensions. Thus, for example, a label set that only specifies a location dimension (e.g., "Loc: Liechtenstein") implicitly includes all possible label values in other label dimensions (e.g., "Role: All workloads, Env: All workloads, etc.).

Illustrating this principle, in a third example, the above constraint rule (example constraint rule 2) may be applied to the following segmentation rule:

| Example Segmentation Rule 2b | | |
| --- | --- | --- |
| Providers | Service | Consumers |
| Loc: Liechtenstein | SSH 22/TCP | Loc: Liechtenstein |

This segmentation rule permits SSH 22/TCP traffic between workloads 138 contained within Liechtenstein. Applying the constraint rule to the segmentation rule, it can be seen that: (1) the provider workloads having the label set "Loc: Liechtenstein" is within the scope of "Env: Production" specified by the constraint rule because the segmentation rule implicitly includes all environments including "Env: Production"; (2) the consumer workloads having the label set "Loc: Liechtenstein" are within the scope of "Env: Dev" specified by the constraint rule because the segmentation rule implicitly includes all environments including "Env: Dev"; and (3) the service "SSH 22/TCP" is within the scope of the "All services" specified by the constraint rule. Therefore, the segmentation rule is non-compliant.

In yet another example, an effect-based constraint rule may be written as:

| Example Constraint Rule 3 | |
| --- | --- |
| Condition | Approval Workflow |
| Affects at least 1000 workloads | Pre-approval |

The constraint rule may be applied against the following segmentation rule:

| Example Segmentation Rule 3 | | |
| --- | --- | --- |
| Providers | Service | Consumers |
| Env: Dev | All | Env: Dev |

Here, the segmentation rule permits all communications between workloads within the development environment. To apply the constraint rule, the policy management server 120 determines how many workloads are within the development environment (i.e., have the label Env: Dev) within the administrative domain 150 and deems the segmentation rule non-compliant if there are at least 1000 workloads.

In an embodiment, the policy management server 120 may automatically generate recommendations to modify segmentation rules in order to make them compliant. As an example, the following constraint rule may be enforced.

| Example Constraint Rule 4 | | | |
| --- | --- | --- | --- |
| Providers | Service | Consumers | Approval Workflow |
| All workloads | Telnet (23/TCP) | All Workloads | Pre-approval |

The above constraint rule may be applied to the following segmentation rule:

| Example Segmentation Rule 4a | | |
|---|---|---|
| Providers | Service | Consumers |
| App: ERP | All Services | App: ERP |

The rule is non-compliant because it allows Telnet (23/TCP) traffic in violation of the constraint rule. The policy management server 120 may generate the following recommendation to make the rule compliant:

| Example Segmentation Rule 4b | | |
|---|---|---|
| Providers | Service | Consumers |
| App: ERP | All Services except Telnet (23/TCP) | App: ERP |

The manager may review the recommendation and decide to accept or reject the modified rule.

In another example, the following constraint rule may be present:

| Example Constraint Rule 5 | | | |
|---|---|---|---|
| Providers | Service | Consumers | Approval Workflow |
| Tier: Internal | All Services | Tier: DMZ | Post-Approval |

This constraint indicates that any segmentation rules permitting connections from DMZ to the internal network are non-compliant.

The constraint is applied to the following segmentation rule:

| Example Segmentation Rule 5a | | |
|---|---|---|
| Providers | Service | Consumers |
| Env: Production | SSH 22/TCP | Role: Jump Hosts |

The segmentation rule is deemed non-compliant because it allows connections from Jump Hosts (including those in DMZ) to the production environment workloads (including those in the internal network). This rule could be modified in various ways to avoid being non-compliant. For example, the provider portion may be changed to exclude the internal tier, or the consumer portion may be changed to exclude the DMZ tier. In an embodiment, the policy management server 120 generates two suggested rules to cover both of these possibilities:

| Example Segmentation Rule 5b | | |
|---|---|---|
| Providers | Service | Consumers |
| Env: Production | SSH 22/TCP | Role: Jump Hosts Tier: All but DMZ |

| Example Segmentation Rule 5c | | |
|---|---|---|
| Env: Production Tier: All but Internal | SSH 22/TCP | Role: Jump Hosts |

The suggested rules may be provided to a manager to review and decide whether or not to accept or reject the suggested rules.

Figure 2:
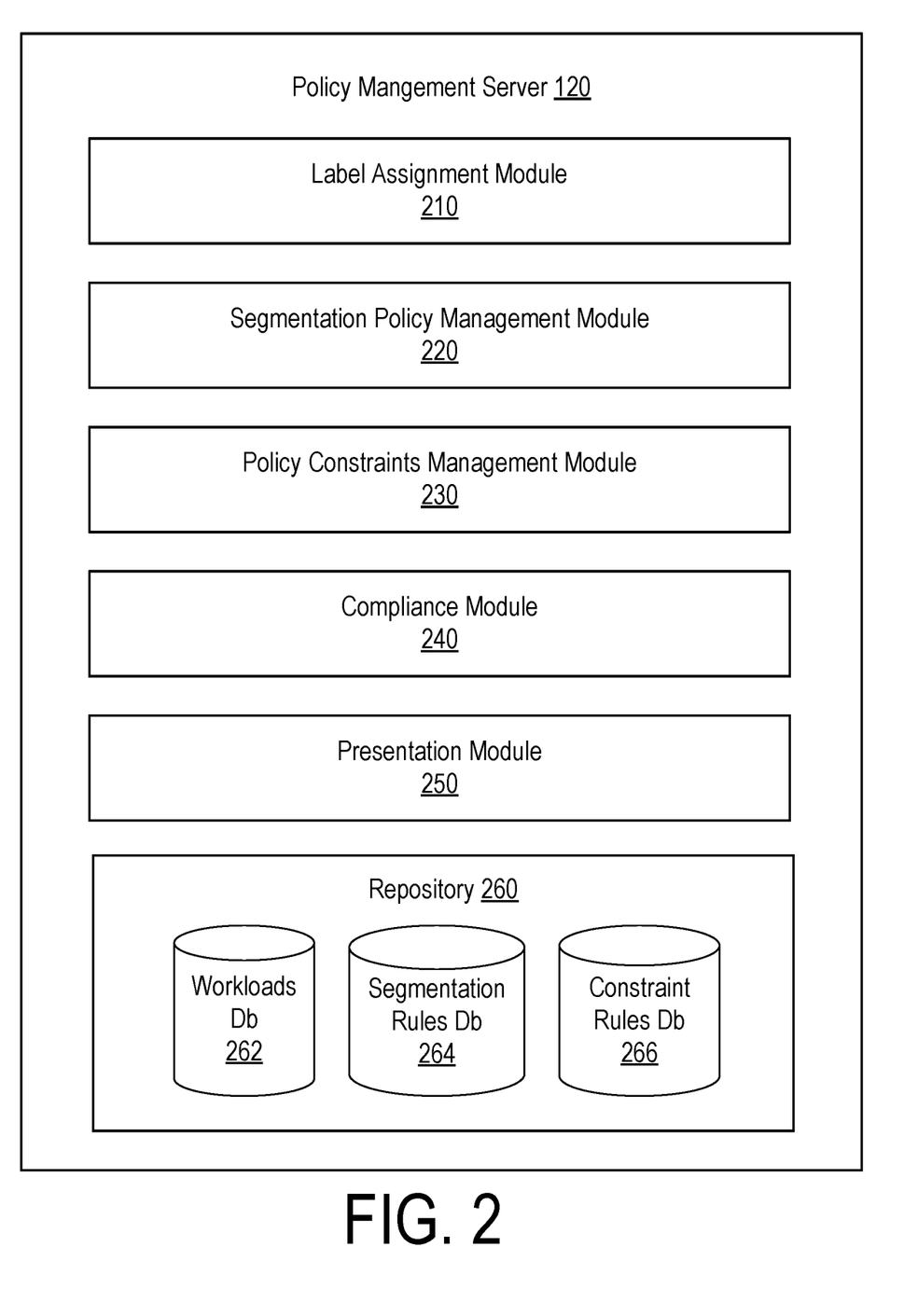
FIG. 2 is an example embodiment of a policy management server.

FIG. 2 is a high-level block diagram of an embodiment of a policy management server 120. The policy management server 120 comprises a label assignment module 210, a segmentation policy management module 220, a policy constraints management module 230, a compliance module 240, a presentation module 250, and a repository 260. The repository 260 may comprise a workloads database 262 that stores associations between workloads 138 and their respective label sets, a segmentation rules database 264 that stores a segmentation policy as a set of rules, and a constraint rules database 266 that stores the constraint rules. In alternative embodiments, the policy management server 120 may include different or additional components. The various components of the policy management server 120 may be implemented as one or more processors and a non-transitory computer-readable storage medium that stores instructions executed by the one or more processors to carry out the functions attributed to the policy management server 120 described herein.

The label assignment module 210 facilitates assignment of labels to workloads 138. For example, the label assignment module 210 may assign labels based on a set of configurable label assignment rules that may be managed by an administrator via the administrative client 160. Alternatively, labels for individual workload 138 may be manually assigned by an administrator. Labels may be updated dynamically based on changing characteristics of workloads 138.

The segmentation policy management module 220 manages configuring and updating of a segmentation policy comprising a set of segmentation rules. The segmentation rules may be manually configured by a system administrator or may be generated automatically based on various predefined segmentation templates. The segmentation policy management module 220 furthermore distributes the rules to enforcement modules 132. For example, the segmentation policy management module 220 determines which segmentation rules are relevant to different enforcement modules 132 depending on the labels of the workloads 138 associated with each enforcement module 132 and distributes only relevant rules to each enforcement module 132. Thus, different enforcement modules 132 may receive different subsets of the rules depending on which workloads 138 are associated with them. The segmentation policy management module 220 may dynamically update instructions sent to the enforcement modules 132 in response to changes in the segmentation policy, changes to the labels of workloads 138, changes to the applications executing on the workloads 138, changes to the enforcement state of services, or changes to application information associated with the applications.

The policy constraints management module 230 manages configuring and updating of policy constraints. In an embodiment, only administrators with elevated privileges are able to configure the policy constraints.

The compliance module 240 applies the constraint rules to the segmentation rules to determine compliance of the segmentation rules. The compliance module 240 furthermore manages workflow associated with the segmentation rules such as maintaining an approval state of the segmentation rules, and facilitates notifications to the managers and provisioners to resolve non-compliant rules. In an embodiment, the compliance module 240 may furthermore generate recommended changes to the segmentation rules to resolve non-compliancy. Alternatively, the compliance module 240 may automatically change segmentation rules to make them compliant.

The presentation module 250 interfaces with the administrative client 160 to present a user interface enabling an administrator to view a representation of the traffic flows. For example, the presentation module 250 may generate a graphical interface representing all or a portion of the traffic flow graph with the workloads 138 illustrated as nodes and the traffic flows to and from the workload 138 illustrated as edges connecting relevant nodes. An administrator may similarly select an edge on the graph to view information about the corresponding traffic flow such as, for example, services associated with the traffic flow, ports and protocols associated with the traffic flow, or statistical information associated with the traffic flow.

Figure 3:
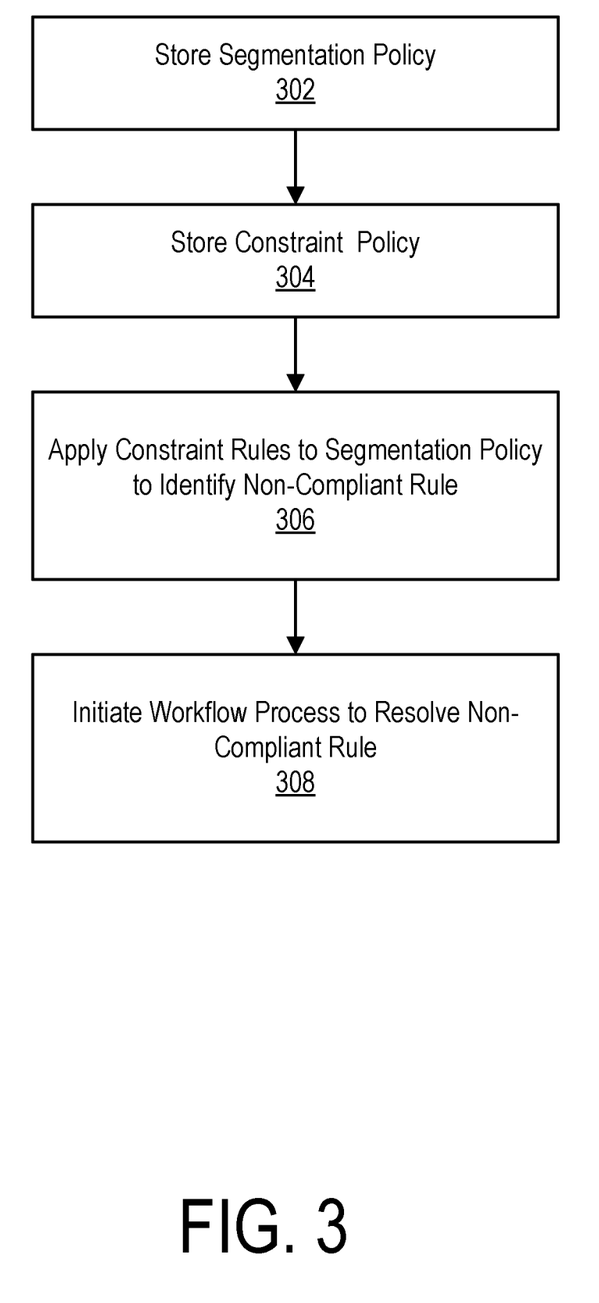
FIG. 3 is a flowchart illustrating an example embodiment of a process for applying policy constraints to a segmentation policy.

FIG. 3 is a flowchart illustrating an example embodiment of a process for managing compliance of a segmentation rule based on policy constraints. The policy management server 120 stores 302 a segmentation policy and stores 304 policy constraints. The policy management server 120 applies 306 the constraint rules of the policy constraints to the segmentation policy to identify rules of the segmentation policy that are not compliant with the policy constraints. Responsive to identifying a non-compliant rule, the policy management server 120 initiate 308 a workflow process to resolve the non-compliant rule.

Figure 4:
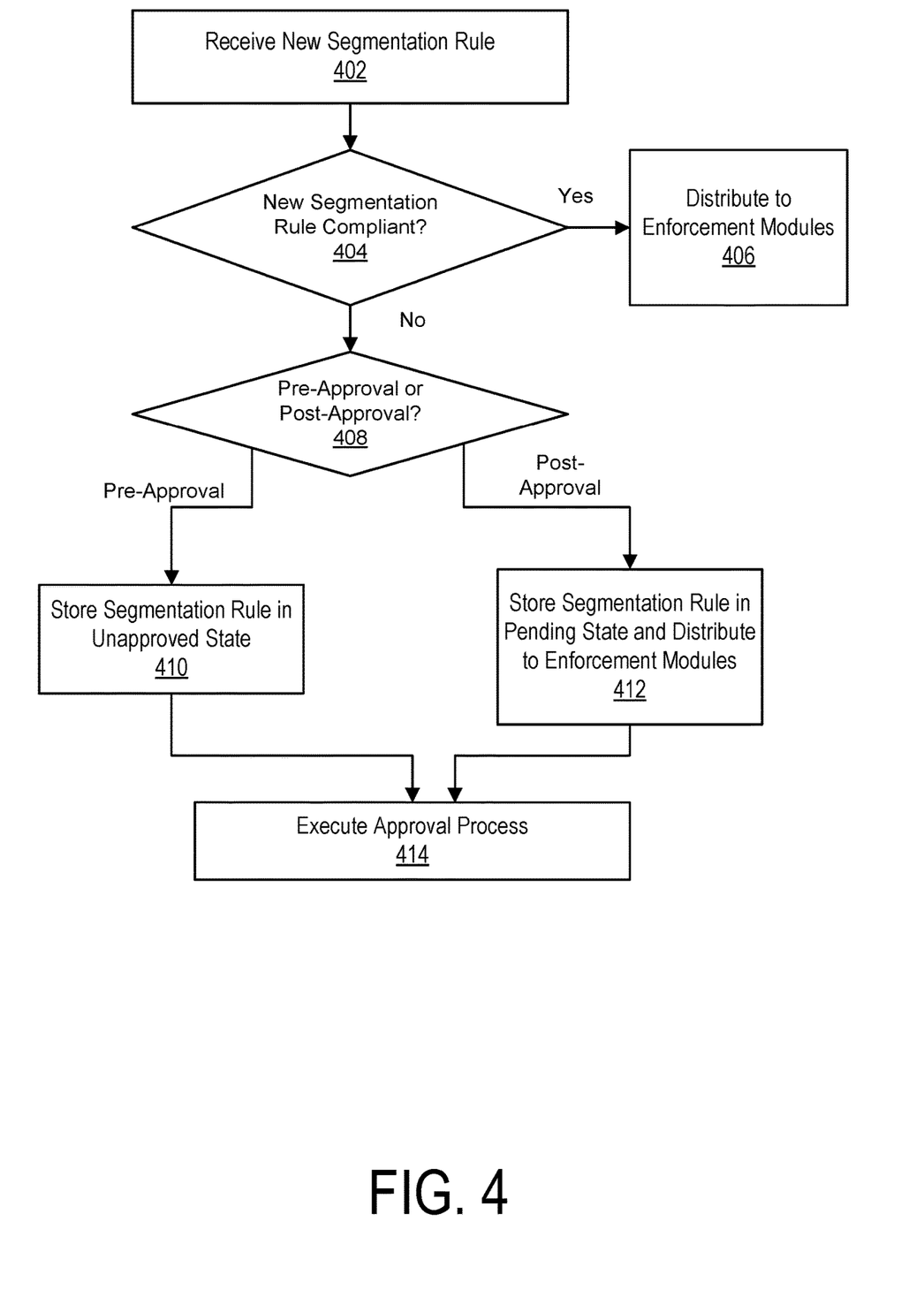
FIG. 4 is a flowchart illustrating an example embodiment of a process for processing an update to a segmentation policy.

FIG. 4 illustrates an example embodiment of a process for updating distribution of a segmentation policy in response to a new segmentation rule being added. The policy management server 120 receives 402 the new segmentation rule and applies the existing constraint rules to determine 404 if the new segmentation rule is compliant. If the new segmentation rule is compliant, then the policy management server 120 is distributed 406 to the enforcement modules 132 for enforcement. If the new segmentation rule is not compliant, the policy management server 120 determines 408 if the violated constraint rule has a pre-approval or post-approval workflow field. If the violated constraint rule has a pre-approval workflow, the non-compliant segmentation rule is stored in an unapproved state without sending it to enforcement modules 132 for enforcement. An approval process is then executed 414 in which a provisioner can approve or deny the unapproved rule as described above. If approved, the segmentation rule is distributed to the enforcement modules for enforcement. Otherwise, if denied, the manager that created the segmentation rule may be alerted that the rule is denied and may remove the rule or submit a new request for approval.

If the new segmentation rule is configured for a post-approval workflow process, the rule is stored 412 in a pending state and is sent to the enforcement modules 132 for enforcement prior to executing 414 the approval process. The provisioner can still determine whether to approve or deny the rule. If denied, the manager that created the segmentation rule may be alerted that the rule is denied and may remove the rule or submit a new request for approval.

Figure 5:
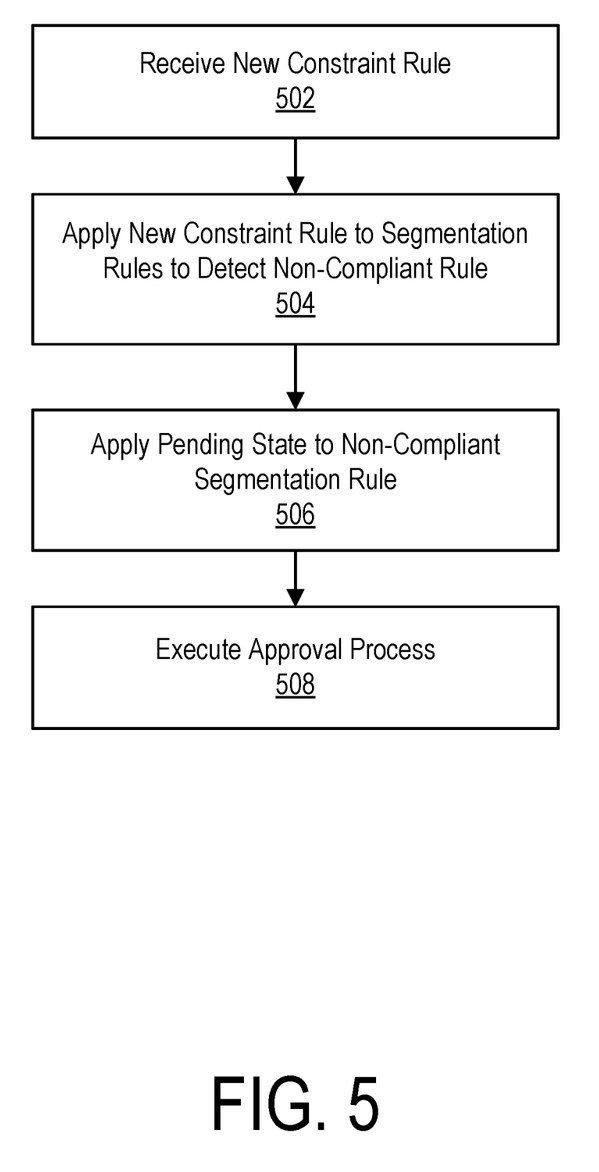
FIG. 5 is a flowchart illustrating an example embodiment of a process for processing an update to policy constraints.

FIG. 5 illustrates an example embodiment of a process for updating distribution of a segmentation policy in response to a new constraint rule being added. The policy management server 120 receives 502 the new constraint rule and applies 504 the new constraint rule to the segmentation policy to determine if any segmentation rules violate the new constraint rule. If a non-compliant segmentation rule is detected, the rule is placed in a pending state for being non-compliant and an approval process 508 is executed. The approval process may involve notifying a manager that the rule is non-compliant to request removal or resubmission of the rule. The manager may request modify or remove the non-compliant rule, or request approval from a provisioner. In an embodiment, the process of FIG. 5 is applied for segmentation rules that exist prior to creation of a constraint rule regardless of whether the new constraint rule is configured for a pre-approval or post-approval workflow. Thus, creation of the new constraint rule does not affect existing segmentation rules absent manual removal of the non-compliant rule.

In alternative embodiments, the above-described workflow processes may be simplified to automatically enforce rules that are compliant and to automatically remove segmentation rules from enforcement that are non-compliant. In this embodiment, the enforced segmentation rules may therefore be updated automatically upon application of the constraint rules without requiring any manual intervention.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for managing enforcement of a segmentation policy by a plurality of distributed enforcement modules, the modules comprising:
    obtaining, at a policy management server, a segmentation policy comprising a set of segmentation rules that specify a white list of permissible connections between workloads providing and consuming network-based services;
    obtaining, at the policy management server, policy constraints comprising a set of constraint rules that each define a set of conditions for identifying compliance of the segmentation rules;
    applying the constraint rules to the set of segmentation rules to identify a non-compliant segmentation rule that is within a scope of a matching constraint rule;
    initiating a workflow process to resolve the non-compliant segmentation rule; and
    distributing the segmentation policy to the plurality of distributed enforcement modules to enable the plurality of distributed enforcement modules to enforce the segmentation policy.

2. The method of claim 1, wherein initiating the workflow process comprises:
    determining that the matching constraint rule has a pre-approval workflow requirement and that the matching constraint rule existed prior to creation of the non-compliant segmentation rule;
    associating an unapproved state with the non-compliant segmentation rule; and
    sending a notification to an administrative client indicating non-compliance of the non-compliant segmentation rule,
    wherein the segmentation policy distributed to the plurality of distributed enforcement modules omits the non-compliant segmentation rule while in the unapproved state.

3. The method of claim 2, further comprising:
    receiving an approval for the non-compliant segmentation rule;
    associating an approved state with the non-compliant segmentation rule; and
    responsive to receiving an action to make the non-compliant segmentation rule effective, distributing the non-compliant segmentation rule to the plurality of distributed enforcement modules for enforcement.

4. The method of claim 1, wherein initiating the workflow process comprises:
    determining that the matching constraint rule has a pre-approval workflow requirement and that the non-compliant segmentation rule existed prior to creation of the matching constraint rule;
    associating a pending state with the non-compliant segmentation rule; and
    sending a notification to an administrative client indicating non-compliance of the non-compliant segmentation rule,
    wherein the segmentation policy distributed to the plurality of distributed enforcement modules includes the non-compliant segmentation rule while in an unapproved state.

5. The method of claim 4, further comprising:
    receiving an approval for the non-compliant segmentation rule; and
    associating an approved state with the non-compliant segmentation rule.

6. The method of claim 1, wherein initiating the workflow process comprises:
    determining that the matching constraint rule has a post-approval workflow requirement;
    associating a pending state with the non-compliant segmentation rule; and
    sending a notification to an administrative client indicating non-compliance of the non-compliant segmentation rule,
    wherein the segmentation policy distributed to the plurality of distributed enforcement modules includes the non-compliant segmentation rule while in an unapproved state.

7. The method of claim 6, further comprising:
    receiving an approval for the non-compliant segmentation rule; and
    associating an approved state with the non-compliant segmentation rule.

8. The method of claim 1, wherein initiating the workflow process comprises:
    automatically generating one or more modified segmentation rules having a more limited scope than the non-compliant segmentation rule and that does not violate the policy constraints; and
    distributing the modified segmentation rules to the plurality of distributed enforcement modules for enforcement.

9. The method of claim 1, wherein the constraint rules specify a specified service, a specified set of provider workloads, and a specified set of consumer workloads, wherein applying the constraint rules comprises identifying the non-compliant segmentation rule as permitting at least one of the provider workloads to provide the service to at least one of the consumer workloads.

10. The method of claim 9, wherein the constraint rules identify the specified consumer workloads and the specified provider workloads by respective multi-dimensional label sets.

11. The method of claim 9, wherein the constraint rules identify the specified service by at least one of: a port, a protocol, and a service identifier.

12. A non-transitory computer-readable storage medium storing instructions for managing enforcement of a segmentation policy plurality of distributed enforcement modules, the instructions when executed causing a processor to perform steps comprising:
    obtaining, at a policy management server, a segmentation policy comprising a set of segmentation rules that specify a white list of permissible connections between workloads providing and consuming network-based services;
    obtaining, at the policy management server, policy constraints comprising a set of constraint rules that each define a set of conditions for identifying compliance of the segmentation rules;
    applying the constraint rules to the set of segmentation rules to identify a non-compliant segmentation rule that is within a scope of a matching constraint rule;

initiating a workflow process to resolve the non-compliant segmentation rule; and distributing the segmentation policy to the plurality of distributed enforcement modules to enable the plurality of distributed enforcement modules to enforce the segmentation policy.

13. The non-transitory computer-readable storage medium of claim 12, wherein initiating the workflow process comprises:

determining that the matching constraint rule has a pre-approval workflow requirement and that the matching constraint rule existed prior to creation of the non-compliant segmentation rule;

associating an unapproved state with the non-compliant segmentation rule; and sending a notification to an administrative client indicating non-compliance of the non-compliant segmentation rule, wherein the segmentation policy distributed to the plurality of distributed enforcement modules omits the non-compliant segmentation rule while in the unapproved state.

14. The non-transitory computer-readable storage medium of claim 12, wherein initiating the workflow process comprises:

determining that the matching constraint rule has a pre-approval workflow requirement and that the non-compliant segmentation rule existed prior to creation of the matching constraint rule;

associating a pending state with the non-compliant segmentation rule; and sending a notification to an administrative client indicating non-compliance of the non-compliant segmentation rule, wherein the segmentation policy distributed to the plurality of distributed enforcement modules includes the non-compliant segmentation rule while in the an unapproved state.

15. The non-transitory computer-readable storage medium of claim 12, wherein initiating the workflow process comprises:

determining that the matching constraint rule has a post-approval workflow requirement;

associating a pending state with the non-compliant segmentation rule; and sending a notification to an administrative client indicating non-compliance of the non-compliant segmentation rule, wherein the segmentation policy distributed to the plurality of distributed enforcement modules includes the non-compliant segmentation rule while in an unapproved state.

16. The non-transitory computer-readable storage medium of claim 12, wherein initiating the workflow process comprises:

automatically generating one or more modified segmentation rules having a more limited scope than the non-compliant segmentation rule and that does not violate the policy constraints; and distributing the modified segmentation rules to the plurality of distributed enforcement modules for enforcement.

17. The non-transitory computer-readable storage medium of claim 12, wherein the constraint rules specify a specified service, a specified set of provider workloads, and a specified set of consumer workloads, wherein applying the constraint rules comprises identifying the non-compliant segmentation rule as permitting at least one of the provider workloads to provide the service to at least one of the consumer workloads.

18. A computer system comprising:

one or more processors; and a non-transitory computer-readable storage medium storing instructions for managing enforcement of a segmentation policy by a plurality of distributed enforcement modules, the instructions when executed causing the one or more processors to perform steps comprising:

obtaining, at a policy management server, a segmentation policy comprising a set of segmentation rules that specify a white list of permissible connections between workloads providing and consuming network-based services;

obtaining, at the policy management server, policy constraints comprising a set of constraint rules that each define a set of conditions for identifying compliance of the segmentation rules;

applying the constraint rules to the set of segmentation rules to identify a non-compliant segmentation rule that is within a scope of a matching constraint rule;

initiating a workflow process to resolve the non-compliant segmentation rule; and distributing the segmentation policy to the plurality of distributed enforcement modules to enable the plurality of distributed enforcement modules to enforce the segmentation policy.

19. The computer system of claim 18, wherein the constraint rules specify a specified service, a specified set of provider workloads, and a specified set of consumer workloads, wherein applying the constraint rules comprises identifying the non-complaint segmentation rule as permitting at least one of the provider workloads to provide the service to at least one of the consumer workloads.

20. The computer system of claim 18, wherein initiating the workflow process comprises:

automatically generating one or more modified segmentation rules having a more limited scope than the non-compliant segmentation rule and that does not violate the policy constraints; and distributing the modified segmentation rules to the plurality of distributed enforcement modules for enforcement.

* * * * *